United States Patent
Kohler

[15] 3,666,255
[45] May 30, 1972

[54] HIGH FLOW HAND-HOLDABLE SCARFING TORCH

[72] Inventor: Rudolph H. Kohler, Amawalk, N.Y.

[73] Assignee: Union Carbide Corporation, New York, N.Y.

[22] Filed: Feb. 19, 1970

[21] Appl. No.: 12,664

[52] U.S. Cl. ..........................................266/23 P, 239/424.5
[51] Int. Cl. ..............................................................B23k 7/06
[58] Field of Search ....................266/23 P, 23 S, 23 T, 23 H; 239/424.5, 419.3, 419

[56] References Cited

UNITED STATES PATENTS

| | | | |
|---|---|---|---|
| 2,148,936 | 2/1939 | Geibig et al. | 239/424.5 |
| 935,684 | 10/1909 | Peterson | 266/23 P UX |
| 2,570,386 | 10/1951 | Scheller | 266/23 P |
| 1,291,864 | 1/1919 | Harris | 266/23 P UX |
| 1,907,604 | 5/1933 | Stephenson | 239/419.3 |
| 2,266,834 | 12/1941 | Walker et al. | 239/424.5 |
| 2,510,227 | 6/1950 | Jacobsson | 239/424.5 X |

*Primary Examiner*—Frank T. Yost
*Attorney*—Paul A. Rose, Thomas I. O'Brien, Harrie M. Humphreys and Lawrence G. Kastriner

[57] ABSTRACT

A hand-holdable scarfing torch capable of utilizing high oxygen flow rates and providing a 30 to 50 percent increase in scarfing pass width as compared with existing scarfing torches of comparable thrust.

2 Claims, 3 Drawing Figures

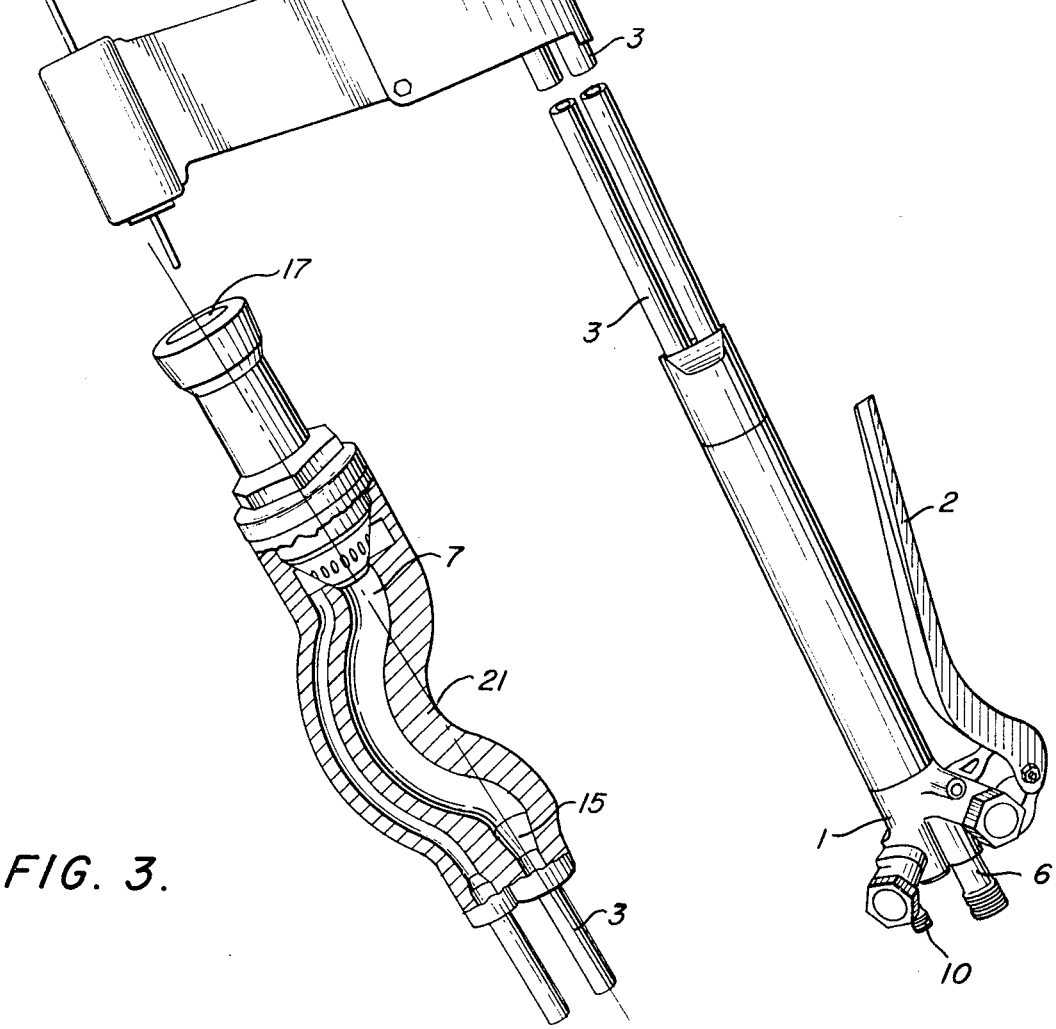

HIGH FLOW HAND-HOLDABLE SCARFING TORCH

BACKGROUND

This invention relates to scarfing torches capable of being hand held, and more particularly to torches which can operate at oxygen flow rates of up to about 13,000 cu. ft. per hour.

Hand holdable scarfing torches, employing a stream of oxygen gas, are used in the manufacture of steel to remove surface defects. In operation, a workman brings his lighted torch into flame contact with a steel workpiece, the nozzle being aimed at about a 45° angle to the plane of the workpiece surface. When melting has begun, a main oxygen stream is initiated with melting sustained by an exothermic oxygen-iron reaction, and the torch is moved across the workpiece thereby cutting a channel in said workpiece which is usually deep enough to remove undesired impurities. Multiple, overlapping, parallel passes of the scarfing torch are successively applied across the workpiece surface until all of the surface to be scarfed has been freed of imperfections. During such scarfing operations, the workman must compensate for jet reaction force caused by the oxygen stream's high nozzle exit velocity.

The productivity of a hand-holdable scarfing torch is dependent upon, among other things, the pass width which is a direct function of the scarfing torch's oxygen flow rate. It follows therefore that an increase in oxygen flow rate would increase hand-holdable scarfing torch productivity. If a standard prior art torch were to be operated at an oxygen flow rate greater than its normal design level, oxygen nozzle exit mass flow rate would increase to such an extent that jet reaction would render the torch unmanageable. In addition, a higher oxygen flow rate in such a prior art torch would cause an increase in pass depth, otherwise known as gouging, and would cause "finning" of the workpiece. Finning is a term used to describe the result of a momentum exchange from the oxygen stream to contiguous flowable metal causing an upward metal flow from the workpiece surface, which flow solidifies as a fin.

On first glance, merely scaling up the size of existing scarfing torches to accommodate higher flow rates of oxygen, while maintaining present levels of oxygen stream nozzle exit velocities, would increase torch pass width without causing gouging or finning. Unfortunately, scaling up existing torches is undesirable because the increased weight of such torches renders them unmanageable.

OBJECTS

An object of this invention is to provide an improved hand-holdable scarfing torch comparable in size and weight to existing hand-holdable scarfing torches but with increased oxygen flow rate capacity such that its scarfing pass width is 30 to 50 percent greater than that of existing torches having comparable thrust.

An additional object is to provide a scarfing torch capable of yielding increased pass width without incurring problems of gouging and finning.

SUMMARY OF THE INVENTION

The above and other objects which will become apparent to those skilled in the art from the following description are achieved by the present invention which comprises: a hand-holdable scarfing torch comprising in combination a nozzle assembly having an inlet end and a discharge port; a nozzle head communicating with the nozzle assembly at its inlet end; a valve block; a torch body connectively disposed between said nozzle head and said valve block a continuous passage for gaseous oxygen flow through said valve block, torch body, nozzle head and nozzle assembly; and a continuous passage for fuel gas flow through said valve block, torch body, nozzle head and nozzle assembly, which oxygen and fuel gas passages communicate in a mixing chamber formed by mating of the nozzle assembly and the nozzle head; the improvement comprising an expansion chamber located in a section of the oxygen flow passage in the nozzle head, the axis of which is out of line of sight passage communication with the axis of the nozzle assembly discharge port, and wherein the cross-sectional area of the oxygen passage from the expansion chamber to the discharge port of the nozzle assembly is at least as great as the greatest cross-sectional area of said expansion chamber.

DESCRIPTION OF THE DRAWINGS

FIG. 2 is a partially sectioned perspective view of a hand-holdable scarfing torch embodying the present invention.

FIG. 3 is a partially sectioned perspective view of hand-holdable scarfing torch body, nozzle head and nozzle assembly embodying the present invention.

DETAILED DESCRIPTION

Figure 1:
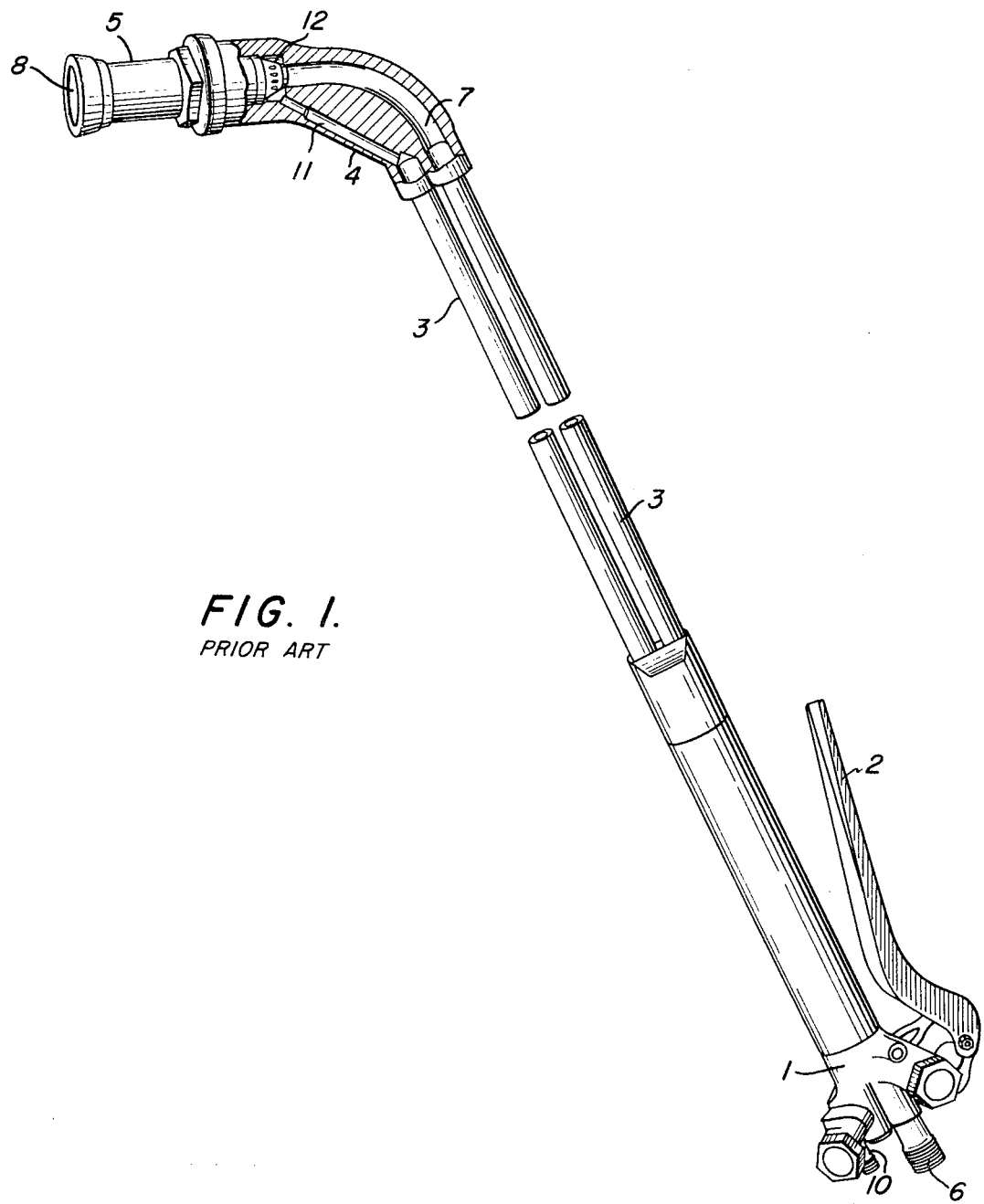
FIG. 1 is a partially sectioned perspective view of a prior art hand-holdable scarfing torch.

FIG. 1 shows a typical prior art hand scarfing torch having a valve block 1 with an oxygen flow rate control lever 2 communicating therewith. A torch body portion 3 communicating at one end with the valve block 1 and at the other end with a nozzle head portion 4. Torch nozzle assembly 5, as can be seen, communicates with that end of the nozzle head 4 opposite the end which communicates with the torch body portion 3. In operation, oxygen enters valve block inlet fitting 6 and is controllably fed through a passage (shown as passage 7 as it passes through the nozzle head portion of the torch of FIG. 1) in the valve block 1, body portion 3, nozzle head 4, and nozzle assembly 5 and thereafter discharges from said nozzle assembly 5 at discharge port 8. Fuel gas enters through fitting 10 provided in valve block 1 and flows through a passage (shown as passage 11 as it passes through nozzle head portion 4) provided in the valve block 1, body portion 3, and nozzle head 4 and mixes with oxygen in the nozzle head in mixing chamber 12 prior to passing through nozzle assembly 5.

FIG. 2 shows a scarfing torch exemplifying the present invention and comparable in size and passage arrangement to that of FIG. 1. A primary difference is that nozzle head 14 of FIG. 2 is provided with an expansion chamber 15 in oxygen passage 7 which chamber increases the cross-sectional area of passage 7 by about 50 percent. The increased cross-sectional area of passage 7 is maintained on the downstream side of chamber 15 without reduction. It should be noted that expansion chamber 15 is placed in oxygen flow passage 7 so that its axis 20 is not on a line of sight with the axis of nozzle assembly discharge port 17. If this expansion chamber were placed after the bend 19 in the nozzle head 14 and on a line of sight with nozzle assembly discharge port 17, dynamic effects of the high velocity oxygen stream entering said expansion chamber would carry on through discharge port 17 yielding a higher oxygen nozzle exit velocity and an associated unmanageably high torch thrust. By arranging expansion chamber 15 and the nozzle assembly discharge port 17 not in a line of sight relationship, an oxygen flow rate can be obtained which is as much as twice that of torches of comparable size, weight and thrust. It should be clear that if nozzle assembly 16 were arranged such that its flow axis was substantially in line with that of torch body portion 3, see FIG. 3, then a reduction in torch thrust would be obtained by placing a bend 21 in the nozzle head flow passage 7 downstream from the expansion chamber 15 thereby preventing line of sight communication between expansion chamber 15 and discharge port 17 such that the dynamic flow of oxygen into expansion chamber 15 would be interrupted by the downstream bend in passage 7 thereby achieving the same results as if the nozzle assembly were arranged such that its flow axis and that of the expansion chamber were not aligned as is the case with the torch shown in FIG. 2.

Ultimately, torch thrust is determined by the mass and velocity of the oxygen stream in the axis of its discharge from the torch. Due to torch geometry and weight, and gas expansion dynamics typical in a given hand-holdable torch, oxygen expansion must take place prior to alignment with the discharge axis to insure low torch thrust.

The ratio of upstream to downstream passage cross-sectional areas across the expansion chamber, as well as oxygen feed pressure, and the pressure drop characteristics of a given torch in the valve block, body portion and nozzle assembly are all relevant considerations in determining the ultimate oxygen flow velocity at the nozzle assembly discharge port. For this reason, no single ratio of upstream to downstream passage cross-sectional areas can be given for all scarfing torches.

EXAMPLES

In an example of this invention, a scarfing torch such as shown in FIG. 2 was prepared using the torch body and valve block of a commercially available hand scarfing torch. The valve block was modified to increase its oxygen flow capacity by increasing the internal diameter of its oxygen inlet fitting to 0.5 inches. No other modifications to the valve block or torch body were required. A 75° nozzle head was specially cast from nodular iron with the oxygen passage feeding into an expansion chamber having an internal diameter of 0.5 inches and with said oxygen passage immediately downstream from the expansion chamber having an internal diameter of 0.8 inches. In addition, the nozzle head was cast such that the nozzle assembly attachment end could receive a commercially available high oxygen flow rate nozzle. The special nozzle head and nozzle assembly were fitted to the valve block and torch body. Scarfing oxygen was delivered through a "D" size hose up to within 15 feet of the torch. Use of a short 15 foot length of smaller "C" size hose made torch handling easy. By way of comparison, the modified torch was found to be capable of delivering almost twice as much scarfing oxygen as the conventional torch for the same oxygen line pressure. Under normal operating conditions the conventional torch is operated with an oxygen regulator pressure of about 105 psig and delivers about 6,000 cu. ft. of oxygen per hour. The scarfing torch modified according to this invention had an operating regulator pressure of about 125 psig and delivered about 12,500 cu. ft. of oxygen per hour. Tests showed that the torch modified according to this invention had a thrust comparable to that of the conventional torch and that starting techniques, traverse speeds, and torch angles were essentially the same for operating both the modified torch and the conventional torch. In addition, the modified torch produced a wide, flat pass, good fin condition, good wash around the corners, and generally produced better defect removal than the conventional torch. Best performance was noted for the torch of this invention at between 125 and 130 psig at the regulator with oxygen flowing. Under this condition, pass width was about 50 percent greater than that of the conventional torch under comparable conditions of steel grade and surface condition. The modifications added only about two pounds to the weight of the conventional torch which normally weighs about 8 ½ pounds.

It is known that a workpiece will begin to melt more quickly under a starting flame if a bit of molten metal is deposited on the workpiece surface when heating begins. This can be accomplished by feeding a metal rod into the torch starting flame, which rod melts and deposits as molten metal drops on the workpiece surface thereby beginning a melt puddle. The metal rod is fed into the torch starting flame by means of a rod feeder which is generally made part of the scarfing torch, see U.S. Pat. No. 2,570,386 issued to A. P. Scheller on Oct. 9, 1951. The modified torch of this invention had a starting rod feed mechanism attached thereto substantially as is shown in the heretofore mentioned Scheller patent.

I claim:

1. In a hand-holdable scarfing torch comprising in combination a nozzle assembly having an inlet end and a discharge port; a nozzle head communicating with the nozzle assembly at its inlet end; a valve block; a torch body connectively disposed between said nozzle head and said valve block; a continuous passage for gaseous oxygen flow through said valve block, torch body, nozzle head and nozzle assembly; and a continuous passage for fuel gas flow through said valve block, torch body, nozzle head and nozzle assembly, which oxygen and fuel gas passages communicate in a mixing chamber formed by mating of the nozzle assembly and the nozzle head; the improvement comprising an expansion chamber located in a section of the oxygen flow passage in the nozzle head, the axis of which is out of line of sight passage communication with the axis of the nozzle assembly discharge port, and wherein the cross-sectional area of the oxygen passage from the expansion chamber to the discharge port of the nozzle assembly is at least as great as the greatest cross-sectional area of said expansion chamber and wherein the axis of the torch body is substantially in line with the nozzle assembly axis, and the expansion chamber is out of line of sight passage communication with the nozzle assembly discharge port.

2. A scarfing torch as described in claim 1 having a starting rod feeder operably attached thereto.

* * * * *